UNITED STATES PATENT OFFICE.

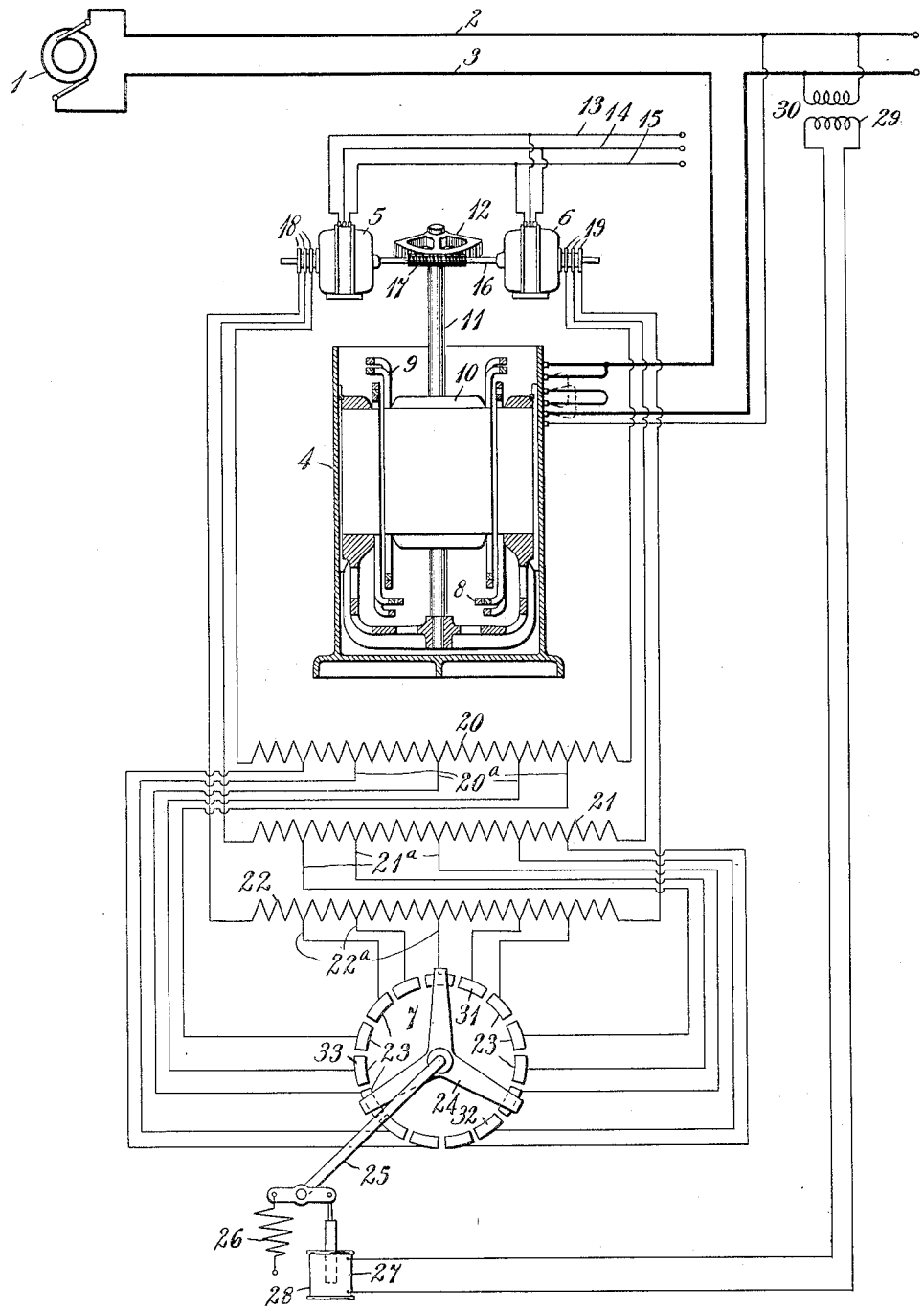

THEODORE VARNEY, OF PITTSBURGH, PENNSYLVANIA, ASSIGNOR TO WESTINGHOUSE ELECTRIC AND MANUFACTURING COMPANY, A CORPORATION OF PENNSYLVANIA.

REGULATOR FOR ELECTRIC CIRCUITS.

1,140,926.  Specification of Letters Patent.  Patented May 25, 1915.

Application filed February 1, 1912. Serial No. 674,798.

*To all whom it may concern:*

Be it known that I, THEODORE VARNEY, a citizen of the United States, and a resident of Pittsburgh, in the county of Allegheny and State of Pennsylvania, have invented a new and useful Improvement in Regulators for Electric Circuits, of which the following is a specification.

My invention relates to electric circuit regulators and it has special reference to such transformer regulators as embody relatively movable primary and secondary members in inductive relation and are known as induction regulators.

The object of my invention is to provide a simple and durable operating means for regulators of the class above indicated that shall respond rapidly and automatically to variations in the current, voltage or other predetermined condition in the regulated circuit.

For operating an induction regulator or other device having a member capable of a limited movement or adjustment, a single operating motor has sometimes been employed in connection with automatic means for starting, stopping and reversing the motor to produce the desired movement of the regulator. A continuously operating motor has also been utilized in connection with a pair of clutches and suitable gearing in order to avoid the necessity for reversing the motor.

The use of a single motor which must be started from rest in the one or the other direction to adjust a regulator has the disadvantage of operating at comparatively slow speeds, while the use of a single continuously operating motor with friction clutches is complicated mechanically and relatively expensive to construct.

In a limited aspect, my invention comprises a pair of continuous-torque electric motors mounted on a single shaft and acting in opposite directions, together with a simple regulating means for simultaneously increasing the torque of one motor and either decreasing or killing the torque of the other motor in order to produce the desired adjustment of the regulator, to which the motor shaft is connected by suitable gearing.

The single figure of the accompanying drawing is a diagrammatic view of a regulator and its circuit connections, arranged and constructed in accordance with my invention.

Referring to the drawing, the regulating system here shown comprises a single-phase alternating current generator 1 which may be replaced by any suitable source of energy, a distributing circuit 2—3, an induction regulator 4 which may be replaced by regulators or regulating devices of other types, a pair of operating motors 5 and 6 for the regulator and a motor-governing switch 7.

The regulator comprises a primary winding 8 and a secondary winding 9 which are energized from the distributing circuit 2—3 in the usual manner, a movable member 10, of which the winding 9 forms a part, and a shaft 11 to which a gear segment 12 is secured. The motors 5 and 6 are alike and are continuously supplied with energy from any suitable source (not shown) through auxiliary circuit conductors 13, 14 and 15. The motors are provided with a shaft 16, having a worm gear 17, which meshes with the gear segment 12, so that rotation of the shaft 16 produces relatively small adjustments of the movable member 10 of the regulator.

The secondary windings of the motors 5 and 6 are brought out through collector rings 18 and 19 and are joined through resistors 20, 21 and 22. The resistors are correspondingly subdivided by a plurality of taps 20ª, 21ª and 22ª which are respectively connected to a plurality of contact fingers 23 with which the motor-governing switch 7 is provided. Three of the contact fingers 23 are interconnected by a multi-arm contact member 24 which is rotatively mounted on a shaft 25 and is adjusted in the one or the other direction, according as a spring 26 or an electromagnet 27 (which are adapted to act oppositely on the shaft 25) predominates. The winding 28 of the electromagnet 27 is energized from the secondary winding 29 of a transformer 30, the primary winding of which is connected across the distributing circuit 2—3.

The energization of the electromagnet winding 28 and the position of the contact member 24 is thus dependent upon the electromotive force of the distributing circuit but it may, of course, be made responsive to the current traversing the distributing circuit or to some other condition which the regulator is intended to maintain at a constant value.

The operation of, and the circuit connections for, the system are as follows: Assuming that the parts occupy the positions shown in the diagram, it is evident from the position of the contact member 24 that the resistances included in the secondary circuits of the motors 5 and 6 are equal and, consequently, since the motors are alike and are connected to the same supply circuit, their torques will be equal and opposite and the movable member of the regulator will be at rest. The electromagnet 27 and the spring 26 are so designed that the forces exerted by them are equal and opposite and, consequently, if, under these conditions, the voltage in the distributing circuit 2—3 increases slightly, the electromagnet 27 will be increasingly energized and the contact member 24 will be adjusted in a clockwise direction. When moving in this direction, it will first engage contact members 31, 32 and 33, thereby reducing the resistance in the secondary circuit of the motor 6 and correspondingly increasing the resistance in the secondary of the motor 5. The torque exerted by the motor 6 will, consequently, predominate and rotative movement of the shaft 16 and adjustment of the regulator member 10 in one direction will result. The arrangement of parts is such that adjustment of the regulating member tends to restore the voltage of the distributing circuit to normal, and, consequently, the spring 26 and electromagnet 27 will be balanced in the new position until some other change in the line voltage occurs.

Each of the motors 5 and 6 is, of course, designed so that it is not injured by the continuous application of electric current to its windings when operating, when held stationary or when forced backwardly by the operation of the other motor.

The electromagnet 27 and the spring 26 may be replaced by any suitable mechanism for operating the switch 7 which is connected directly to the line or to the terminals of a transformer, such as a transformer 30, or energized indirectly by means of a meter relay, such as that shown and described in Patent No. 851,709, granted April 30, 1907, to the Westinghouse Electric & Manufacturing Company upon an application filed by W. H. Thompson.

Instead of automatically and simultaneously increasing the torque of one of the motors 5 and 6 and decreasing that of the other, the torque of only one of the motors may be decreased or reduced, while the other remains substantially constant, or the torque of only one of the motors may be increased; although I prefer the arrangement hereinbefore set forth, since it produces a more gradual movement of the regulator, without materially delaying its action.

Variations in the arrangement and circuit connections of the system may be affected without departing from the spirit of my invention, and I intend that only such limitations shall be imposed as are indicated in the appended claims.

I claim as my invention:

1. In a regulating system for an electric circuit, the combination with a regulated circuit, a regulator electrically connected to the regulated circuit and having a movable element, and a pair of continuously excited motors mechanically connected to said movable element and tending to adjust it in opposite directions, of automatically actuated torque-regulating means for the motors, and electro-responsive means dependent upon the regulated circuit for governing said torque-regulating means.

2. In a regulating system for an electric circuit, the combination with a regulated circuit, a regulator therefor having a movable element, and a pair of electric motors electrically independent of said regulated circuit and mechanically connected to said movable element for adjusting it in opposite directions, of automatically actuated torque-regulating means for the motors, and electro-responsive means dependent upon the regulated circuit for governing said torque-regulating means.

3. In a regulating system for an electric circuit, the combination with a regulated circuit, a regulator therefor having a movable element and a pair of electric motors electrically independent of said regulated circuit and mechanically connected to said movable element for adjusting it in opposite directions, of a single automatically actuated controlling device for simultaneously and oppositely regulating the motor torques, and electro-responsive means dependent upon the regulated circuit for governing said torque-regulating means.

4. In a regulating system for an electric circuit, the combination with a regulated circuit, a regulator having a movable member, and a pair of induction motors adapted to be continuously energized from an independent source of energy and operatively connected to said movable member to act in opposition to each other, of a resistor connected at its respective ends to the windings of said motors, an automatically actuated and adjustable switch for oppositely varying the influence of said resistor on the respective motors, and electro-responsive means dependent upon the regulated circuit for governing said switch.

5. In a regulating system for an electric circuit, the combination with a regulated circuit, an induction regulator having a movable member, and a pair of polyphase induction motors adapted to be continuously energized from an independent source of energy and operatively connected to said movable member to act in opposition to each other, of a multi-branch resistor connected at its respective ends to the secondary windings of said motors, an adjustable switch for interconnecting corresponding points in the several resistor branches, and a spring and an electromagnet acting oppositely upon the switch, said magnet being variably energized in accordance with predetermined variations in the regulated circuit.

6. In a regulating system, the combination with an electric circuit to be regulated, an independent source of energy, an induction regulator electrically connected to the regulated circuit and having a movable member, and a pair of induction motors continuously energized from an independent source and mechanically connected to the movable regulator member to adjust it in opposite directions, of a multi-branch resistor connected at its respective ends to the secondary windings of said induction motors, a switch for interconnecting corresponding points in the several resistor branches, and a spring and an electromagnet acting oppositely upon the said switch for simultaneously and oppositely varying the torques of the motors, said electromagnet being electrically connected to the regulated circuit.

In testimony whereof, I have hereunto subscribed my name this 18th day of Jan. 1912.

THEODORE VARNEY.

Witnesses:
R. J. DEARBORN,
B. B. HINES.